United States Patent [19]

Waly

[11] 4,076,415

[45] * Feb. 28, 1978

[54] MICRORECORD HAVING MIRROR-IMAGES

[75] Inventor: Adnan Waly, Stamford, Conn.

[73] Assignee: Izon Corporation, Stamford, Conn.

[ * ] Notice: The portion of the term of this patent subsequent to Dec. 7, 1993, has been disclaimed.

[21] Appl. No.: 668,979

[22] Filed: Mar. 22, 1976

Related U.S. Application Data

[63] Continuation of Ser. No. 443,028, Feb. 15, 1974, Pat. No. 3,995,956.

[51] Int. Cl.² ............................................. G03B 13/28; G03B 27/32; G03B 23/08
[52] U.S. Cl. ....................... 355/45; 353/27 R; 355/27
[58] Field of Search ................. 355/133, 24, 44, 45, 355/50, 54, 27; 354/292, 14, 354; 353/27 R, 21, 78, 77, 74

[56] References Cited

U.S. PATENT DOCUMENTS

| | | | |
|---|---|---|---|
| 3,733,121 | 5/1973 | Smitzer | 353/78 X |
| 3,820,135 | 6/1974 | Dickson | 354/81 |
| 3,995,956 | 12/1976 | Waly | 355/133 |

*Primary Examiner*—Donald A. Griffin

[57] ABSTRACT

A microfiche or other form of microfilm record having a main set of images thereon which may be selectively projected onto a viewing screen. In order to facilitate the making of reproductions of the recorded images without interposing a mirror between the sensitive film or the plate of the reproducer and the image projection system, the microfiche incorporates a companion set of images each being a reversed image of the corresponding image on the main set whereby when a reversed image is projected, it may be directly reproduced to produce a nonreversed, readable copy.

4 Claims, 6 Drawing Figures

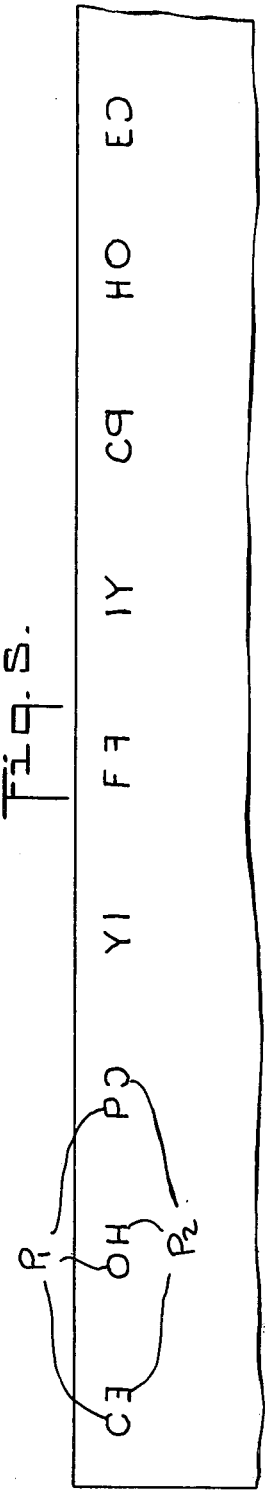
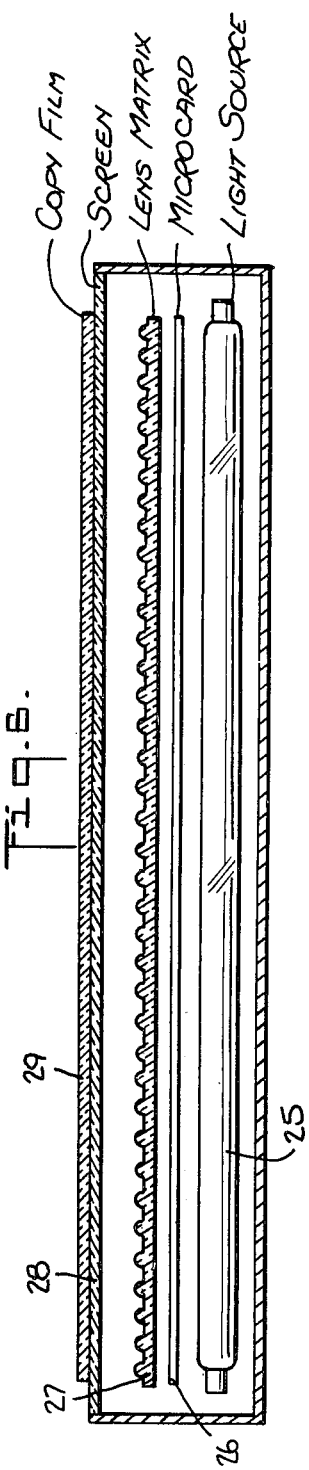
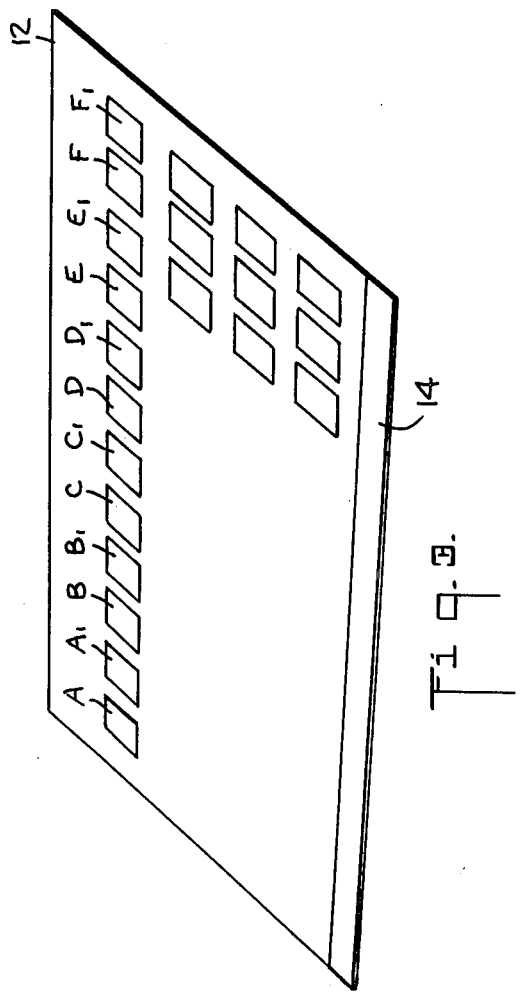

MICRORECORD HAVING MIRROR-IMAGES

RELATED APPLICATION:

This application is a continuation of application Ser. No. 443,028 filed Feb. 15, 1974 entitled "Microrecord Having Mirror-Images", now U.S. Pat. No. 3,995,956.

BACKGROUND OF THE INVENTION

This invention relates generally to micro-image techniques for recording and reproducing data, and more particularly to a microfiche bearing a set of images each representing a page of data which is viewable on the screen of a microfiche reader and a companion set of reversed images each of which, when displayed on the screen, may be directly copied.

In order to conserve storage space and afford a convenient means for retrieving information, it is now common practice to photograph documents, records, the pages of books and various forms of technical data in a sharply reduced scale on microfilm. Conventionally, a micro-scale image of each page or document is recorded on a separate frame on a microfilm roll. To view the recorded data, the roll is inserted in a reader or optical projector and the film is advanced therein to place a selected frame into an optical gate whereby an enlarged and readable image is cast on a screen.

More recently, a new storage technique has been developed wherein a group of microfilm images are placed on a single record sheet rather than along a film roll. In such microrecords, which are known commercially as "microfiches", the micro-scale images are generally arranged serially along parallel rows, whereby the micro-images are distributed in a grid formation on the sheet. A microfiche is useful where one wishes to incorporate on a single reproducible sheet, interrelated documents or other information pertaining to a particular subject matter. Thus, with a single microfiche, one may record all of the pages of a printed patent.

In order to make use of the microfiche, the user requires an optical reader. This reader must include a mechanism to shift the microfiche in the X and Y directions, in order to align a particular frame with the optical system serving to project an enlarged image of the selected frame onto the screen.

In a conventional microfiche reader, when a selected image frame is projected onto the screen, the image displayed thereon is erect and therefore suitable for direct viewing. But one cannot make a photographic copy of the displayed image by placing a sensitive film against the screen, for then the image developed on the sensitive surface of the film will be a reversed or mirror image of the screen image.

In order, therefore, to provide a non-reversed and readable copy, it is presently necessary to interpose a plane mirror in the path between the projection system of the reader and the sensitive film in the copier. Since the image formed by the plane mirror is erect, reversed (right side appears as left side) and the same size as the object, the reversed image projected by the mirror on the sensitive surface of the film gives rise to a developed image thereon that is properly oriented.

The practical objection to the conventional copier arrangement for microfiche readers and other apparatus adapted to make copies of microfiche images, is that the requirement for a mirror stands in the way of producing a highly compact readercopier machine. Because the mirror must be interposed between the projection system of the reader and the film or other sensitive media in the copier (such as a xerographic plate) the structure must be sufficiently commodious to accommodate this spatial requirement.

In my U.S. Pat. No. 3,704,068 there is disclosed a micro-image technique in which the pages of data are not recorded in discrete frames on a microfiche but are dissected and interlaced thereon to produce a multiple image record which may be read-back by selectively enlarging only the pattern of dispersed characters or bits which together constitute the data of a single page. A significant advantage of this technique is that it makes possible a highly compact reader whose dimensions are comparable to those of a standard book. But even with a reader of this type, one cannot make copies of the illuminated image formed onto the screen unless a mirror is interposed between the sensitive film and the screen, as a consequence of which the arrangement is no longer exceptionally compact.

SUMMARY OF THE INVENTION

In view of the foregoing, the main object of this invention is to provide a microfiche or any other form of micro-record with micro-scale images that may be projected and reproduced without the intermediary of a mirror or other reflector.

More specifically it is an object of the invention to provide a microfiche having main images which may be projected and viewed in a conventional manner and companion images which are the mirror-images of the main images and which, when projected, may be directly reproduced to afford non-reversed, readable copies.

Also an object of the invention is to provide a compact low-cost reader copier for microfiches of the above-noted type, selectively capable of presenting illuminated large scale images on a screen or of making copies thereof.

Briefly stated, these objects are attained in a microfiche or other form of microrecord having a main set of reduced-scale images thereon which may be selectively projected onto a viewing screen to provide illuminated images on a larger scale.

In order to facilitate the reproduction of the recorded images by photographic, xerographic or any other known form of copying apparatus without the interposition of a reflective optical path between the sensitive film or plate of the reproducer and the projection system of the reader, the microfiche incorporates a companion set of images each of which is a reversed or mirror image of the corresponding image in the main set, whereby when a reversed image is projected, it may be directly reproduced to produce a non-reversed readable copy.

In practice, the reader-copier for a microfiche in accordance with the invention may include, in addition to the usual X-Y indexing mechanism for placing a selected frame into alignment with the optical system for projection onto a viewing screen, a stepping mechanism which when actuated will substitute for the viewed frame its companion frame to expedite the making of copies. Where the microrecord is of the type disclosed in my prior U.S. Pat. No. 3,704,068 and is made up of interlaced main image patterns and companion image patterns, the reader-copier therefor need be no larger than a standard book, for then the copy film may be placed directly against the screen of the book-sized reader.

OUTLINE OF THE DRAWING

For a better understanding of the invention as well as other objects and further features thereof, reference is made to the following detailed description to be read in conjunction with the accompanying drawing, wherein:

FIG. 3 is a microfiche in accordance with the invention of a type useable with the reader-copier shown in FIGS. 1 and 2;

FIG. 4 is an enlarged view of a portion of the microfiche shown in FIG. 3;

FIG. 5 illustrates schematically another form of microfiche in accordance with the invention; and FIG. 6 schematically shows a reader-copier for a microfiche in the form shown in FIG. 1.

DESCRIPTION OF THE INVENTION

Figure 1:
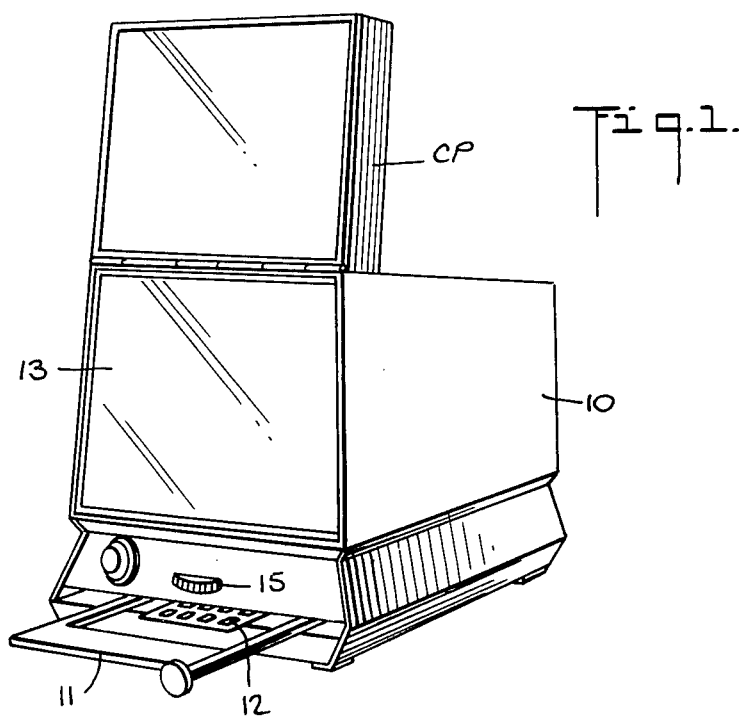
FIG. 1 is a perspective view of one preferred embodiment of an optical reader-copier in accordance with the invention.
Figure 2:
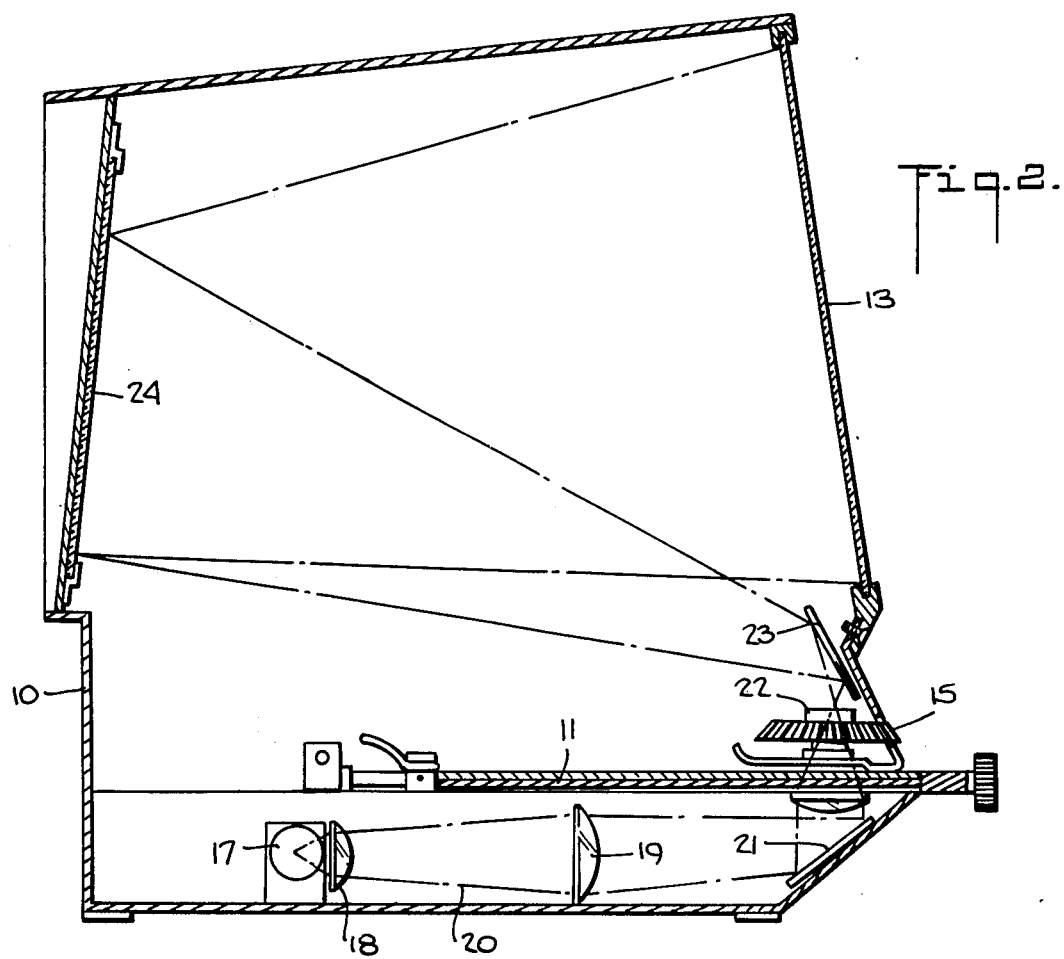
FIG. 2 is a sectional view of the reader-copier shown in FIG. 1.

Referring now to FIGS. 1 and 2, there is shown one preferred embodiment of an optical reader-copier comprising a housing 10, a movable platform 11 for receiving a microrecord 12 in accordance with the invention, and a screen 13 for displaying a greatly enlarged image of a frame selected from the microrecord.

Microrecord 12, as shown separately in FIGS. 3 and 4, is in microfiche form and is constituted by a flat transparent sheet of rectangular configuration, with one longitudinal edge having a strip 14 thereon which may be opacified for purposes of containing suitable indicia such as a title or other identifying data. The format of the microfiche may be in any commercially available form, such as a transparent multi-channel jacket for receiving strips of microfilm, or it may be a flat film whose frames have been formed by a strip-and-repeat camera operation.

The body of the microfiche is characterized by several horizontal rows of micro-image frames, such as the row in which the frames are identified by letters A, $A_1$, B, $B_1$, C, $C_1$, D, $D_1$, E, $E_1$, F, $F_1$. All other rows have a like arrangement of frames. The image frames identified by letters A, B, C, D, E and F represent frames included in the main set of image frames, and the microimages therein are in conventional form. The frames identified by letters $A_1$, $B_1$, $C_1$, $D_1$, $E_1$, and $F_1$ represent frames included in the companion set of frames, and these contain mirror-images of the correspondingly-lettered frames of the main set.

Thus to give a simple example, if frame A of the main set, as shown in FIG. 4, contains the letter F, then its companion frame $A_1$ contains the mirror image of letter F which image is the reverse of the image appearing in frame A.

The purpose of the reader-copier as applied to microfiche 12 is to permit selective vertical and horizontal shifting of the microfiche placed on platform 11 in order to present on screen 13 any one of the main or companion frames, the selected main frame being viewed and the selected companion frame being copied. In order to select a desired frame for presentation on the screen, platform 11 is moved laterally by turning a knob 14, the platform being moved in and out by pushing and pulling the platform.

A focusing dial 15 moves the lens elements toward and away from the microfiche to clearly focus the image on the screen. A brightness knob 16 connected to a suitable rheostat can be turned to adjust the brightness of the light source and thus the brightness of the image on the screen.

As shown in FIG. 2, the optical path with respect to light rays emitted by an incandescent lamp 17 mounted near the rear of the reader includes condensing lenses 18 and 19 for providing a relatively narrow light beam 20. This beam is reflected upwardly by a mirror 21 so that it passes through the selected frame of the microfiche lying on platform 11. The beam thereafter passes through a focusing lens assembly 22 and is reflected by two mirrors 23 and 24, the projected image being brought to focus on the rear of translucent screen 13. Focusing dial 15 threadably engages lens assembly 22 so that by turning this dial, the lens assembly is caused to move toward or away from the microfiche on the platform to enable sharp focusing of the fiche image on the screen.

This reader mechanism is similar to that disclosed in U.S. Pat. No. 3,412,061 which may be referred to for a more detailed description of the mechanism. Any other known form of X-Y platform adjusting mechanism may be used to present a selected microfiche frame onto a screen, such as that disclosed in the Gross et al U.S. Pat. No. 3,446,552.

When the operator wishes to make a copy of a given frame, he selects the companion frame for presentation on screen 13 and then brings down over the screen a contact print copier CP which is hinged to the upper front end of casing 10 and is normally raised therefrom, as shown in FIG. 1. The contact printer is provided with a sensitive film which is brought against screen 13. This simple type of printer is merely cited by way of example and in practice, any other known form of printer may be used.

In practice, the reader copier may be provided with an automatic stepping mechanism operating in conjunction with the X-Y mechanism for selecting a particular microfiche frame, such that when a main frame is selected for viewing, in order to make a copy of the selected frame, one merely actuates the stepping mechanism which then acts to shift the microrecord to present the adjacent companion frame to the associated copier. Also in this arrangement, the light source intensity control may be coordinated with the stepping mechanism, such that when the stepping mechanism is actuated to present a companion frame to the copier, the light intensity is simultaneously increased to a level suitable for copying.

In the foregoing, the invention has been described in connection with a standard microfiche format. The invention is also fully applicable to other microrecord formats such as that disclosed in my prior U.S. Pat. No. 3,704,068 wherein the images do not appear in discrete frames but are dissected to disperse the characters or bits constituting a page or document to be recorded to produce an image pattern on the recording medium, the various image patterns representing the several pages to be recorded being interlaced with each other. In a microrecord of this type, each main image pattern is accompanied by a companion pattern which is a mirror image of the main pattern.

Referring now to FIG. 5, there is shown a microrecord having a dissected main image pattern $P_1$ dispersed on the recording medium, the first line of this pattern being the word "COPYFICHE". It will be seen that this word is dissected so that the bits or letters thereof appear at dispersed positions. The dissected mirror image pattern $P_m$ of this word occupies the directly adjacent area in the medium. Hence if one wishes to copy a selected main image projected onto a viewing screen, one indexes the microrecord to present the companion image on the screen, which companion image may be copied without the need for a reversing mirror. It is not essential that the companion pattern be directly adjacent its corresponding main image pattern, and in practice the companion pattern may be situated at any suitable position which lends itself to selection and projection.

In a reader for a dissected-image microfiche of this type, no mirrors at all are required, and as explained in U.S. Pat. No. 3,704,068, the reader need be no larger in size than a standard book. And since the copier operating in conjunction with this reader operates without the intermediary of a mirror because of the mirror images presented by the reader on the screen, the sensitive film of the copier section may be placed directly against the screen of the reader section. Thus the reader-copier may be virtually as compact as the reader disclosed in my above-identified patent.

This reader-copier as shown in FIG. 6 includes a light source 25 which is adapted to illuminate the dissected-image microrecord 26, the microrecord being interposed between the light source and a lens matrix 27.

Lens matrix 27 is composed of an array of miniature lenses or lensettes having a short optical throw, each lensette being aligned with a respective character or bit in that image pattern on the microrecord which is in registration with the array of lensettes. Thus the reader must include means (not shown) to incrementally shift the position of the microrecord relative to the lens matrix to bring a desired image pattern from the main set into registration with the array. Also included is a stepping mechanism for shifting the microrecord to bring the companion image pattern into registration with the array. In practice, the lens array may be combined with the microrecord, the combination being shiftable relative to an apertured mask which passes only a selected image onto the screen.

The main or the companion image, whichever lies in registration with the array, is projected onto a viewing screen 28 which lies in parallel relation with the lens matrix. As explained in U.S. Pat. No. 3,704,068, this reader may be highly compact. The copy film placed directly against the screen may be of any known type, such as a heat-developable silver-based film whose latent image of the mirror image appearing in the screen is developed by the application of heat. Or the film may be of the commercially available Diazo type which is developed by an ammonia process, or it may be of the vesicular type. In any event, the film 29 lies against the screen and there is no intermediate mirror, so that the reader-copier may be highly compact.

While there have been disclosed preferred embodiments of the invention, it will be appreciated that many changes and modifications may be made without, however, departing from the essential spirit of the invention.

I claim:

1. A microrecord whose reduced scale images may be selectively projected for viewing by an observer or for copying without the use of an image-reversing mirror, said microrecord comprising a common carrier having formed thereon a main set of images each being a photograph in a reduced scale of only one side of a document or other form of intelligence, and a companion set of images displaced from the main set of images, each companion image being the mirror image of the corresponding photograph in the main set, no other images being formed on the common carrier, whereby a selected main image may be viewed by aligning it with an optical system to project it onto a screen and the corresponding companion image may be copied onto a sensitive film by shifting the microrecord relative to said optical system to align said corresponding companion image therewith, said microrecord being a microfiche formed by several horizontal rows of image frames, the frames in each row being constituted by frame pairs in which one is a frame from the main set and the other is its companion frame.

2. A reader-copier machine for a microrecord whose reduced scale images may be selectively projected for viewing by an observer or for copying without the use of an image-reversing mirror, said microrecord comprising a common carrier having formed thereon a main set of images each being a photograph in a reduced scale of only one side of a document or other form of intelligence, and a companion set of images displaced from the main set of images, each companion image being the mirror image of the corresponding photograph in the main set, no other images being formed on the common carrier, whereby a selected main image may be viewed by aligning it with an optical system to project it onto a screen and the corresponding companion image may be copied onto a sensitive film shifting the microrecord relative to said optical system to align said corresponding companion image therewith, said microrecord being a microfiche formed by several horizontal rows of image frames, the frames in each row being constituted by frame pairs in which one is a frame from the main set and the other is its companion frame, said machine comprising:

A a viewing screen;

B an optical system for projecting an image onto said screen;

C a platform supporting said microrecord in operative relation with said optical system;

D indexing means to shift said platform relative to said optical system to cause the platform to assume one operative position in which a selected main image from the main set of images is aligned with said optical system and is projected onto said screen for viewing by said observer and a stepping mechanism associated with said indexing means which, when actuated, causes the platform to assume another operative position in which the companion image of the selected main image is aligned with said optical system and is projected onto said screen for copying;

E a retractable copier having a sensitive film, said copier being retracted from said screen when the selected main image is presented thereon, said copier overlying said screen when the companion image is presented to make a copy thereof; and F means to illuminate said selected main image in said one operative position at a level suitable for viewing and to illuminate the companion image in said other operative position at a higher level suitable for copying.

3. A machine as set forth in claim 2, wherein said film is a heat-developable silver film.

4. A machine as set forth in claim 2, wherein said film is a Diazo film.

* * * * *